US012715802B2

(12) United States Patent
Black et al.

(10) Patent No.: US 12,715,802 B2
(45) Date of Patent: Aug. 25, 2026

(54) ANOXIC BIOREACTOR TREATMENT FOLLOWED BY PH ADJUSTED PEROXIDE/IRON TREATMENT FOR ENHANCED, EFFICIENT SELENIUM REMOVAL IN WASTEWATERS

(71) Applicant: EVOQUA WATER TECHNOLOGIES LLC, Pittsburgh, PA (US)

(72) Inventors: Andrew Black, Clearfield, UT (US); Luke Halverson, Anderson, SC (US); Timothy Pickett, Salt Lake City, UT (US); Rebeccah Chapman, New Peltz, NY (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 1019 days.

(21) Appl. No.: 17/898,486

(22) Filed: Aug. 30, 2022

(65) Prior Publication Data

US 2024/0067547 A1 Feb. 29, 2024

(51) Int. Cl.
*C02F 9/00* (2023.01)
*C02F 1/00* (2023.01)
(Continued)

(52) U.S. Cl.
CPC ................ *C02F 9/00* (2013.01); *C02F 1/008* (2013.01); *C02F 1/5209* (2013.01); *C02F 3/006* (2013.01);
(Continued)

(58) Field of Classification Search
CPC .. C02F 1/008; C02F 1/38; C02F 1/441; C02F 1/444; C02F 1/48; C02F 1/5209; C02F 1/5236; C02F 1/5245; C02F 1/66; C02F 1/722; C02F 1/725; C02F 1/76; C02F 1/78; C02F 3/006; C02F 3/28; C02F 9/00; C02F 2001/007; C02F 2101/103; C02F 2101/106; C02F 2101/163; C02F 2101/20; C02F 2103/10; C02F 2103/18; C02F 2103/365; C02F 2209/003; C02F 2209/005;
(Continued)

(56) References Cited

U.S. PATENT DOCUMENTS 7,550,087 B2 * 6/2009 Peeters .................... C02F 3/06 210/903
7,790,034 B2 9/2010 Peeters et al.
(Continued)

FOREIGN PATENT DOCUMENTS

JP 2015024360 A * 2/2015
WO WO-2012040525 A1 * 3/2012 ............. C02F 1/705

OTHER PUBLICATIONS

Kanai, JP 2015024360 Machine Translation (Year: 2015).*

*Primary Examiner* — Jennifer Dieterle

(57) ABSTRACT

A method of treating selenium-containing wastewater comprises performing anoxic biological treatment of the selenium-containing wastewater to produce a first liquid including a residual dissolved selenium species, introducing an oxidant into the first liquid to form an oxidant-treated first liquid, introducing a coagulant into the oxidant-treated first liquid to form a second liquid having selenium-containing solids, and removing the selenium-containing solids from the second liquid in a solids-liquid separation operation.

12 Claims, 2 Drawing Sheets

(51) Int. Cl.

| | |
|---|---|
| ***C02F 1/52*** | (2023.01) |
| ***C02F 3/00*** | (2023.01) |
| ***C02F 3/28*** | (2023.01) |
| *C02F 1/44* | (2023.01) |
| *C02F 1/66* | (2023.01) |
| *C02F 1/72* | (2023.01) |
| *C02F 101/10* | (2006.01) |
| *C02F 101/16* | (2006.01) |
| *C02F 101/20* | (2006.01) |
| *C02F 103/18* | (2006.01) |

(52) U.S. Cl.

CPC ................ *C02F 3/28* (2013.01); *C02F 1/441* (2013.01); *C02F 1/444* (2013.01); *C02F 1/5245* (2013.01); *C02F 1/66* (2013.01); *C02F 1/722* (2013.01); *C02F 2101/106* (2013.01); *C02F 2101/163* (2013.01); *C02F 2101/20* (2013.01); *C02F 2103/18* (2013.01); *C02F 2209/003* (2013.01); *C02F 2209/04* (2013.01); *C02F 2209/06* (2013.01)

(58) Field of Classification Search

CPC .............. C02F 2209/04; C02F 2209/16; C02F 2303/16; C02F 2303/22; C02G 2305/06

See application file for complete search history.

(56) References Cited

U.S. PATENT DOCUMENTS

| | | | | |
|---|---|---|---|---|
| 8,163,181 | B2 | 4/2012 | Peeters et al. | |
| 2007/0114174 | A1* | 5/2007 | Peeters | C02F 3/302 210/605 |
| 2012/0241381 | A1* | 9/2012 | Bruso | C02F 9/00 210/705 |
| 2015/0151995 | A1* | 6/2015 | Pickett | C02F 3/2853 210/201 |
| 2017/0313608 | A1* | 11/2017 | Peterson | C02F 3/30 |
| 2018/0305229 | A1* | 10/2018 | Huang | C02F 1/705 |
| 2019/0144318 | A1* | 5/2019 | Syed | C02F 9/00 210/631 |
| 2019/0352207 | A2* | 11/2019 | Omotoso | C10G 1/045 |
| 2020/0339457 | A1* | 10/2020 | Basu | C02F 3/006 |
| 2022/0204376 | A1* | 6/2022 | Tai | C02F 9/00 |

* cited by examiner

ANOXIC BIOREACTOR TREATMENT FOLLOWED BY PH ADJUSTED PEROXIDE/IRON TREATMENT FOR ENHANCED, EFFICIENT SELENIUM REMOVAL IN WASTEWATERS

FIELD OF TECHNOLOGY

Aspects and embodiments disclosed herein relate to systems and methods of reducing a concentration of dissolved selenium in water. More particularly, aspects and embodiments disclosed relate to systems and methods including biological water treatment and treatment of feeds containing inorganic contaminants, for example selenium, nitrates or heavy metals, for example, scrubber blow down water from a flue gas desulfurization (FGD) operation in a coal fired power plant or refinery wastewater.

SUMMARY

In accordance with an aspect, there is provided a method of treating selenium-containing wastewater. The method comprises performing anoxic biological treatment of the selenium-containing wastewater to produce a first liquid including residual dissolved selenium species, introducing an oxidant into the first liquid to form an oxidant-treated first liquid, introducing a coagulant into the oxidant-treated first liquid to form a second liquid having selenium-containing solids, and removing the selenium-containing solids from the second liquid in a solids-liquid separation operation.

In some embodiments, the method further comprises adjusting a pH of one of the first liquid or the oxidant-treated first liquid to a pH within a range of from 4 to 6.

In some embodiments, introducing the oxidant into the first liquid includes introducing hydrogen peroxide into the first liquid.

In some embodiments, the hydrogen peroxide is blended with the first liquid in an in-line mixer.

In some embodiments, the solids-liquid separation operation includes one or more of clarification, filtration, centrifugation, or multimedia filtration.

In some embodiments, the oxidant is introduced into the first liquid in an amount and at a concentration sufficient to at least partially oxidize the residual dissolved selenium species in the first liquid.

In some embodiments, the coagulant is blended with the oxidant-treated first liquid in an in-line mixer.

In some embodiments, the anoxic biological treatment of the selenate-containing wastewater produces the first liquid with an ORP of less than −350 mV or between −200 mV and −450 mV.

In some embodiments, the anoxic biological treatment of the selenate-containing wastewater reduces the selenate to one or more of selenite, SeCN, $SeSO_3$, or elemental selenium.

In some embodiments, the method further comprises monitoring an ORP of a process effluent of the solids-liquid separation process and adjusting one or both of the introduction of oxidant or introduction of coagulant to maintain the ORP of the process effluent at greater than or equal to 200 mV.

In some embodiments, an amount of time between completing the anoxic biological treatment of the selenate-containing wastewater and beginning performance of the solids-liquid separation operation for a given amount of wastewater is less than a treatment time in the anoxic bioreactor.

In some embodiments, a hydraulic retention time between an outlet of the anoxic biological treatment and an inlet of the solids-liquid separation operation is less than 10 minutes.

In some embodiments, introducing the coagulant into the oxidant-treated first liquid includes introducing one of ferric chloride, alum, or ferric sulfate into the oxidant-treated first liquid.

In some embodiments, the method produces a process effluent with a total selenium concentration of less than 15 ppb or less than 5 ppb.

In some embodiments, the method further comprises pretreating the selenium-containing wastewater prior to performing anoxic biological treatment to produce a permeate.

In some embodiments, the method further comprises mixing at least a portion of the permeate with the process effluent.

In accordance with another aspect, there is provided a system for the treatment of selenium-containing wastewater. The system comprises an anoxic bioreactor having an inlet fluidically connectable to a source of the selenium-containing wastewater and an outlet, a source of an oxidant configured to introduce the oxidant into a conduit fluidically coupled to and downstream of the outlet of the anoxic bioreactor, a source of a coagulant configured to introduce the coagulant into the conduit downstream of the outlet of the anoxic bioreactor, and a solids-liquid separator having an inlet in fluid communication with the conduit downstream of a point of introduction of the coagulant and downstream of a point of introduction of the oxidant, a solids outlet, and a liquids outlet.

In some embodiments, the system further comprises a source of pH adjustment agent configured to introduce the pH adjustment agent into the conduit downstream of the outlet of the anoxic bioreactor.

In some embodiments, the system further comprises a pH sensor in the conduit downstream of a point of introduction of the pH adjustment agent, and a controller in communication with the pH sensor and configured to control the source of pH adjustment agent to maintain a pH of a liquid downstream of the point of instruction of the pH adjustment agent at a pH in a range of from 4 to 6.

In some embodiments, the system further comprises a first inline mixer in the conduit downstream of the point of introduction of the oxidant and upstream of the solids-liquid separator.

In some embodiments, the system further comprises a second inline mixer in the conduit downstream of the point of introduction of the pH adjustment agent and upstream of the solids-liquid separator.

In some embodiments, the source of oxidant is a source of hydrogen peroxide.

In some embodiments, the source of coagulant is a source of one of ferric chloride, alum, or ferric sulfate.

In some embodiments, the system further comprises a first ORP sensor configured to measure an ORP of liquid exiting the anoxic bioreactor.

In some embodiments, the system further comprises a controller in communication with the first ORP sensor and configured to control the anoxic bioreactor to maintain the ORP of the liquid at less than −350 mV.

In some embodiments, the system further comprises a second ORP sensor configured to measure an ORP of process effluent exiting the liquids outlet.

In some embodiments, the controller is further in communication with the second ORP sensor, the source of oxidant, and the source of coagulant and configured to control one or both of the source of oxidant and source of coagulant to maintain the ORP of the process effluent above 200 mV.

In some embodiments, the system further comprises a pretreatment system including at least one reverse osmosis unit fluidly connected between a source of the selenium-containing wastewater and the anoxic bioreactor.

In some embodiments, the pretreatment system further comprises at least one ultrafiltration unit fluidly connected upstream of the at least one reverse osmosis unit.

In accordance with another aspect, there is provided a method of retrofitting a system for the treatment of selenium-containing wastewater including a bioreactor having an inlet fluidically connected to a source of the selenium-containing wastewater and an outlet. The method comprises connecting a source of oxidant configured to introduce the oxidant to a conduit fluidically coupled to and downstream of the outlet of the anoxic bioreactor, connecting a source of coagulant configured to introduce the coagulant to the conduit downstream of the outlet of the anoxic bioreactor, and connecting a solids-liquid separator having an inlet in fluid communication with the conduit downstream of a point of introduction of the coagulant and a point of introduction of the oxidant.

In some embodiments, the method further comprises connecting a source of pH adjustment agent the conduit downstream of the outlet of the anoxic bioreactor.

In some embodiments, the method further comprises connecting a pH sensor to the system downstream of a point of introduction of the pH adjustment agent, the pH sensor configured to measure a pH of liquid in the conduit downstream of the point of introduction of the pH adjustment agent, and configuring a controller of the system to receive measurements from the pH sensor and to control the source of pH adjustment agent to maintain the pH of the liquid at a level of between 4 and 6.

In some embodiments, the method further comprises connecting an inline mixer configured to mix the pH adjustment agent into a liquid output from the anoxic bioreactor to the conduit.

In some embodiments, the method further comprises connecting an ORP sensor configured to measure an ORP of a process effluent from a liquid outlet of the solids-liquid separator to the system, and configuring a controller of the system to receive measurements from the ORP sensor and to control one or both of the source of oxidant or the source of coagulant to maintain the ORP of the process effluent above 200 mV.

In some embodiments, the method further comprises connecting an inline mixer configured to mix the oxidant into a liquid output from the anoxic bioreactor to the conduit.

In some embodiments, the method further comprises configuring a controller of the system to operate the source of oxidant and source of coagulant to reduce a total selenium concentration in the selenium-containing wastewater from 20 ppb or more to 10 ppb or less.

BRIEF DESCRIPTION OF THE DRAWINGS

The accompanying drawings are not intended to be drawn to scale. In the drawings.

DETAILED DESCRIPTION

Figure 1:
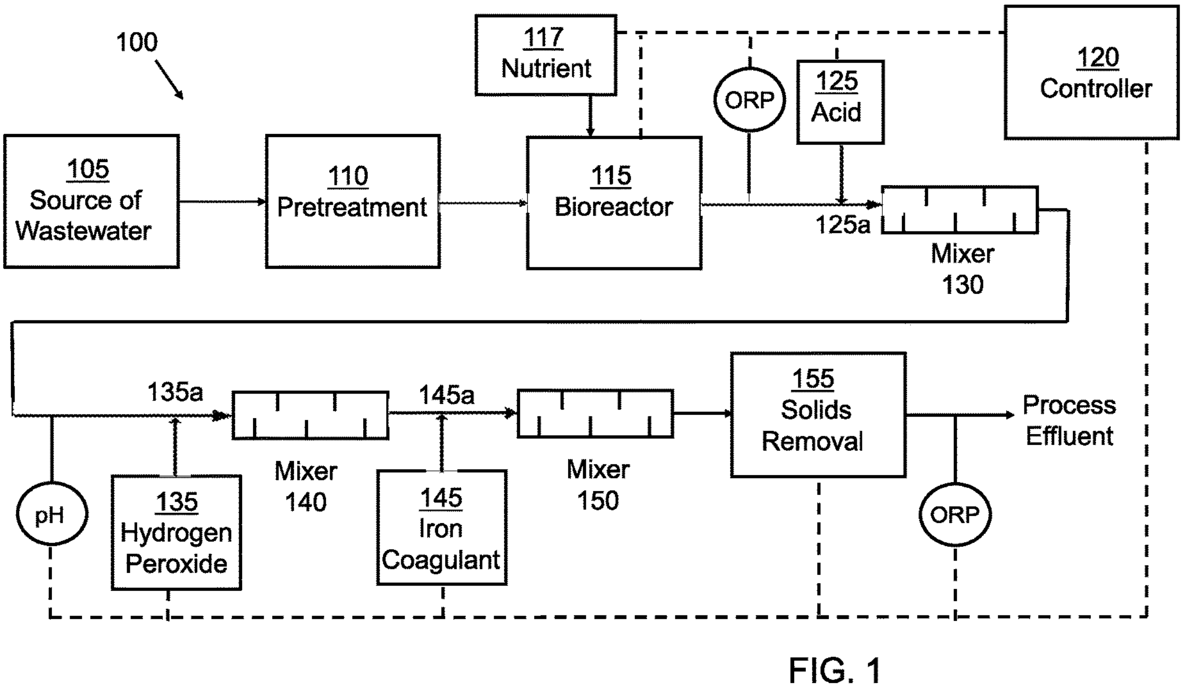
FIG. 1 is a schematic diagram of a system for treatment of selenium-containing wastewater in accordance with embodiments disclosed herein.

Wastewater generated from processes used in coal-fired electric power plants, petroleum refineries, and those related to mining operations, among others, may be contaminated with selenium and other metals and metalloids. Selenium bioaccumulates in can be toxic to birds, fish, and wildlife at elevated levels. Selenium exists in various forms in nature and treatment of selenium contaminated water and wastewater is complicated.

In particular, scrubber blow-down water from a flue gas desulfurization (FGD) operation in a coal-fired power plant contains a wide range of inorganic contaminants removed from the flue gas. The blow down water may also contain organic contaminants, such as di basic acid (DBA), and ammonia added as part of or to enhance the FGD process. The FGD scrubber blow-down water may have very high total dissolved solids where the main anions are chlorides, and the main cations are calcium, magnesium, and sodium. The rate of blow-down may be controlled to maintain a desired chloride concentration causing the blow-down water to have a high, but generally stable chloride concentration. The concentration of other contaminants may vary widely as influenced, for example, by burning coal from different sources even in a single power plant. However, the concentration of total dissolved solids (TDS), total suspended solids (TSS), Ca, and Mg hardness, nitrate, ammonia, and sulfur, for example, as sulphate are all likely to be high, and various heavy metals may be present, making the blow down water very difficult to treat, particularly to achieve very low levels of contaminants. Other wastewaters, such as wastewater discharged from mining operations, agricultural drainage or run off water, other industrial waters or even drinking water, may also have unacceptable concentrations of some or all of these inorganic contaminants.

Some methods of treating blow down water rely on physical and chemical processes to remove inorganic contaminants. The physical and chemical processes may involve costly chemicals and produce large amounts of sludge. Arsenic, mercury, and heavy metals may also be present in the blow down water at above regulated levels. Further, some jurisdictions have recently regulated selenium concentrations in effluents discharged to the environment. The permitted concentration of selenium may be 0.5 ppm or less or 200 ppb or less while the blow down water may contain 1-20 or 2-10 ppm of selenium which is not removed in conventional treatment plants.

Selenium treatment and removal systems may employ methods to chemically reduce soluble selenium to its metallic form, Se (0), and its reduced form, Se (-II), selenide. In some methods of treating scrubber blow-down water or other forms of wastewater anoxic biological treatment processes may be utilized to reduce dissolved selenium in the wastewater into elemental selenium or other forms of selenium that may be subsequently removed from the biologically treated wastewater by a physical process, for example, filtration. In the biological treatment process microbial respiration is performed by certain bacteria when nitrate, a more energetically favorable electron acceptor, is depleted, and the bacteria respire selenate as a substitute terminal electron acceptor to produce selenite. This process may continue with a decrease in oxidation reduction potential (ORP) through selenite to form an insoluble precipitate of elemental selenium. Examples of such processes are described in, for example, U.S. Pat. Nos. 7,550,087 and 8,163,181, the contents of which are incorporated herein by reference.

Anoxic biological treatment of selenium or selenate-containing wastewaters may, in some instances, convert selenium species in the wastewater into species such as SeCN or selenite that are difficult to remove in downstream solid-liquid separation processes such as precipitation or filtration.

Disclosed herein are systems and methods for performing a wastewater treatment process wherein selenium-containing wastewater receives anoxic biological treatment as a primary treatment step followed by pH adjustment to 4-6 SU (if necessary), followed by sequential, inline addition of peroxide followed by addition of a coagulant, for example, alum or an iron-based coagulant such as ferric chloride or ferric sulfate (or inline addition of the coagulant followed by addition of the peroxide), followed by a solids removal step, such as filtration. Aspects and embodiments disclosed herein may solve the problem where anoxic biological treatment alone is insufficient at removing residual dissolved/total selenium concentrations to desired levels. Additionally, anoxic bioreactor effluent waters usually require oxidative post treatment before being suitable for discharge. This treatment approach attains enhanced selenium removal and oxidative post treatment in an efficient treatment process.

Aspects and embodiments involve a biological treatment step, for example, an anoxic biological treatment step, and application of pH adjustment (optional), hydrogen peroxide, and coagulant to liquid output from the biological treatment step. Inline dosing of the hydrogen peroxide followed by coagulant (or the coagulant followed by the hydrogen peroxide) with little retention time may be performed, as it enhances treatment process efficiency—typically, iron co-precipitation treatment is carried out with multiple mix tanks with significant retention times. Aspects and embodiments of the process can also effectively treat SeCN, which is a problematic selenium species, especially for refineries and powerplants. Hydrogen peroxide may be a preferred oxidant in some embodiments, in combination with coagulant (e.g., an iron coagulant such as ferric chloride) dosed into the liquid from the biological treatment operation for effective selenium removal. Stronger oxidants (ozone, hypochlorite, etc.) may also or alternatively be utilized, but in some instances may drive oxidation of the residual dissolved selenium species to too far to selenate ($SeO_4^{2-}$), which may not be easily precipitated by the downstream addition of the coagulant. Other oxidants such as chlorine or oxygen could also or additionally be used. In embodiments in which where reduced selenium oxidation is not necessary the oxidant may serve to co-precipitate the iron that is subsequently added and the residual dissolved selenium.

In some aspects and embodiments, selenate-containing wastewater receives anoxic biological treatment as a primary treatment step. In the biological treatment step, dissolved selenium in the form of selenate is reduced biologically to forms of selenite ($SeO_3^{2-}$), SeCN, selenium sulphoxide ($SeSO_3$) and/or elemental selenium by lowering the ORP of the wastewater to the selenium reducing range of <−350 mV, which may be continually monitored at the outlet of the bioreactor. This ORP level may be controlled by controlling an amount or rate of introduction of nutrient into the bioreactor. In a post treatment step, without breaking pressure, the pH of bioreactor effluent liquid is adjusted to 4-6 SU (if necessary) with a pH adjustment agent, for example, an acid such as $H_2SO_4$, followed by sequential, inline addition of hydrogen peroxide and coagulant. In instances where residual dissolved and/or reduced selenium species are present, such as SeCN, the hydrogen peroxide addition at pH ranges of 4-6 serves to mildly oxidize residual dissolved selenium species, thereby preconditioning the selenium so that it can be effectively removed via coagulant addition. This treatment scheme has been demonstrated to be optimally effective at pH ranges of 4-6 and may be less effective or substantially ineffective without anoxic biological pre-treatment. After addition of hydrogen peroxide and coagulant, the stream (in some embodiments, immediately) enters into a solids removal step (filtration, clarification, etc.), where the iron/selenium precipitate as well as any residual colloidal selenium from the biological reduction step is filtered out. The ORP of the liquid stream exiting the solids removal step may be continually monitored and used to optimize peroxide/iron coagulant chemical addition.

In some aspects and embodiments, existing systems for treatment of selenium/selenate-containing wastewater utilizing biological treatment (e.g., anoxic biological treatment) may be retrofit with pH adjustment, oxidant (e.g., hydrogen peroxide) dosing, and/or coagulant addition subsystems, a solid/liquid separation system if needed, as well as appropriate pH and ORP monitors and a controller (or reprogramming of an existing controller) to maintain the pH and ORP at an outlet of the biological treatment system, downstream of an injection point of pH adjustment agent, and/or at an outlet of the solids/liquid separation system at levels effective for the removal of selenium species from the wastewater as disclosed herein.

One example of a treatment system 100 for selenium/selenate-containing wastewater is illustrated in FIG. 1. Selenium/selenate-containing wastewater, for example, FGD scrubber blow-down water, flows through a conduit from a source 105 of the wastewater into a pretreatment sub-system 110. In the pretreatment sub-system 110 the influent wastewater may be subjected to oxidation in a catalytic oxidation media bed to reduce soluble magnesium and iron into insoluble precipitates which are captured along with other suspended solids in the media bed. This form of pretreatment may be especially useful for refinery wastewater, but may not be necessary for other forms of wastewater, such as FGD scrubber blow-down water. Additionally or alternatively, as described in U.S. Pat. No. 8,163,181, lime or sulfides, or both may be added to the influent wastewater to precipitate calcium, magnesium, and metals. The precipitates may be removed by clarifiers, for example, single stage or double stage clarifiers. Settling can be enhanced by the addition of coagulants or polymers. After precipitation and separation of magnesium, iron, calcium and other suspended solids, the wastewater may be treated by filtration through one or more ultrafilters (UF) or reverse osmosis (RO) filters in a UF skid. This filtration operation may be especially useful for refinery wastewater, but may not be necessary for other forms of wastewater, such as FGD scrubber blow-down water. Ferric chloride and sodium hypochlorite may be added to the wastewater ahead of the UF skid to coagulate suspended solids and some TOC in the wastewater, improving UF performance. The pH of the wastewater may also be adjusted upstream of the UF skid to help prevent scaling of the UF or RO filtration membranes. Dilution water may be added to the concentrate of the NF/RO membrane filtration operation to reduce the TDS concentration of the concentrate, for example, to a TDS of 3500 mg/L or less, to make it more suitable for biological treatment.

RO brine or concentrate (optionally diluted with water) from the pretreatment system is directed into a bioreactor 115, which may be, for example, a SeHAWK® bioreactor skid from Evoqua Water Technologies. Anoxic biological treatment of the pretreated wastewater is performed in the bioreactor 115 which results in reduction of oxidized selenium compounds such as selenate into reduced selenium compounds such as selenite, SeCN, $SeSO_3$, and elemental selenium. Nutrients, for example, a carbon source (e.g., glycerin) and/or macronutrients of nitrogen and/or phosphorous may be added to the bioreactor 115 or to the brine upstream of the bioreactor 115 from a source of nutrients 117 to act as an electron donor for biological reduction and to promote biological growth. The nutrients may include a glycerin based carbon source, for example, BioElix® 131-GUP-900-A nutrient (Evoqua Water Technologies) at a concentration of, for example, 45 mg/L as COD. The biological treatment may be a continuous flow treatment with an average retention time of the permeate from the pretreatment system of between 30 and 300 minutes in the bioreactor 115. Liquid produced in the bioreactor 115 from the pretreatment system permeate may exhibit an ORP within a range at which oxidized selenium compounds are reduced, for example, an ORP of less than or equal to −350 mV or in a range of from −200 mV to −450 mV. On ORP monitor may be disposed at an outlet of the bioreactor may measure the ORP of the liquid output from the bioreactor 115 and provide the ORP measurements to a system controller 120. The system controller 120 may be a Programmable Logic Controller (PLC) programmed to perform the functions described herein or may be or may include an application specific integrated circuit or any other form of computerized control system known in the art. The system controller 120 may adjust operating conditions of the bioreactor 115, for example, nutrient dose to keep the ORP of the liquid output from the bioreactor 155 at a desired level, for example, below −350 mV or in a range of from −200 mV to −450 mV as discussed above.

After the first liquid exits the bioreactor 115, the pH of the first liquid is adjusted (if necessary) to a level that to facilitates and enhances downstream oxidation and precipitation of the residual dissolved selenium species in the first liquid. The pH of the first liquid may be adjusted ro a pH level of between 4 and 6 by addition of a pH adjustment agent from a source 125 of same at an injection point 125*a* in a conduit through which the liquid flows. The pH adjustment agent may be an acid, for example, sulfuric acid. The liquid and acid flow through an in-line mixer 130, for example, a helical static mixer or a dynamic mixer to provide rapid mixing of the pH adjustment agent throughout the volume of the liquid. A pH probe disposed downstream of the in-line mixer 130 measures the pH of the liquid and provides a measurement of the pH to the controller 120 which adjusts the amount or rate of introduction of the pH adjustment agent to maintain the pH of the liquid between 4 and 6. In some embodiments, about 160 mg/L of sulfuric acid may be added into the liquid from the source 125 of pH adjustment agent. The amount of pH adjustment agent added may depend on the quality and composition of the first liquid, for example, an amount of buffering agents present. Hydrochloric acid may be utilized in addition to or as an alternative to the sulfuric acid.

Downstream of the pH adjustment operation, an oxidant, for example, hydrogen peroxide is added to the pH-adjusted first liquid from a source of oxidant 135 through an injection point 135*a* through which the pH-adjusted first liquid flows. The oxidant may be introduced into the pH-adjusted first liquid in an amount and at a concentration sufficient to oxidize any residual dissolved selenium species, for example, SeCN in the pH-adjusted first liquid primarily to elemental Se, but insufficient to oxidize the residual dissolved selenium species to primarily selenate. The oxidant and pH-adjusted first liquid pass through a second in-line mixer 140, for example, a helical static mixer or a dynamic mixer to provide rapid mixing of the oxidant throughout the volume of the pH adjusted first liquid to form an oxidant-treated first liquid. In some embodiments about 5 mg/L to about 500 mg/L of hydrogen peroxide is added to the pH-adjusted first liquid in the oxidant addition operation.

Downstream of the oxidant addition operation, a coagulant, for example, an iron coagulant such as ferric chloride from a source of coagulant 145 is added to the oxidant-treated first liquid through an injection point 145*a* through which the oxidant-treated first liquid flows. The coagulant and oxidant-treated first liquid may pass through a third in-line mixer 150, for example, a helical static mixer or a dynamic mixer to provide rapid mixing of the coagulant throughout the volume of the oxidant-treated first liquid to form a second liquid. An amount of coagulant is added that will cause co-precipitation of a sufficient amount of the selenium in the oxidant-treated first liquid to produce process effluent meeting discharge requirements or regulations. In some embodiments about 5 mg/L to about 500 mg/L of ferric chloride is added to the oxidant-treated first liquid in the coagulant addition operation.

Figure 2:
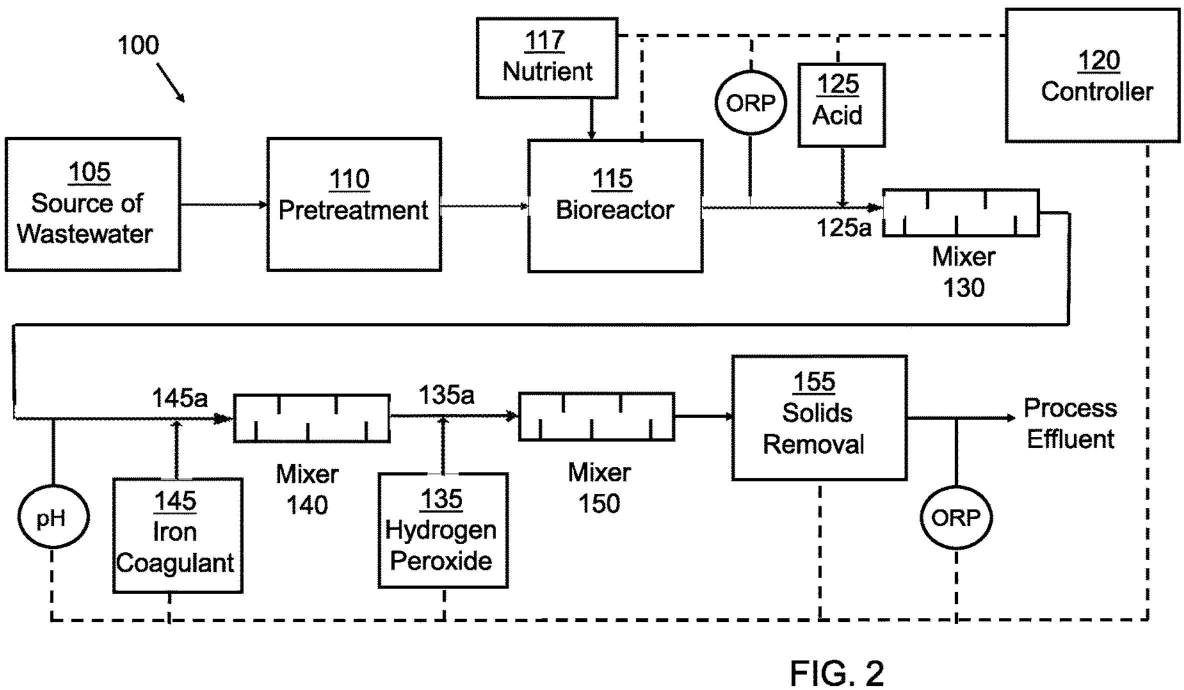
FIG. 2 is a schematic diagram of an alternate embodiment of the system for treatment of selenium-containing wastewater.

In alternate embodiments, the order of addition of the coagulant and the oxidant may be reversed so the coagulant is introduced prior to the oxidant. An example of this embodiment is shown in FIG. 2.

Following the coagulant dosing, the second liquid is directed into a solids/liquid separation sub-system 155. The time between wastewater undergoing treatment in the system exiting the bioreactor 115 and entering the solids/liquid subsystem may be fairly short, for example, less than the time the wastewater spends on average in the bioreactor 115 or less than about 60 minutes. This time may be site specific, depending on feed water quality and treatment goals.

The solids/liquid separation sub-system 155 may include or consist of any one or more of a clarifier, centrifuge, hydrocyclone, membrane filter, mixed media bed filter, magnetic separation chamber, or any other solids/liquid separation system known in the art. The solids/liquid separation sub-system 155 produces a substantially selenium-free process effluent. The process effluent may comprise less than 15 ppb total selenium, for example, between about 2.0 and about 8.0 ppb selenium. The residual selenium in the process effluent may be site specific, depending on feed water quality and treatment goals. In some embodiments, the process effluent comprises less than about 5.0 ppb selenium. In some embodiments, the process effluent comprises between about 0.5 ppb selenium and about 2.0 ppb selenium. For example, the process effluent may comprise between about 0.5 ppb selenium and 1.5 ppb selenium.

A second ORP monitor may be disposed on an outlet of the solids/liquid separation sub-system 155 and may measure an ORP level of the process effluent and provide the measurement of the ORP of the process effluent to the controller 120. The controller may adjust one or both of the amount of oxidant or the amount of coagulant added to the wastewater undergoing treatment in the system to maintain an ORP in the process effluent at which selenium exists in the oxidant-treated first liquid in elemental form or a form that will co-precipitate out of solution due to the addition of the coagulant, for example, an ORP of about 200 mV or more.

EXAMPLE

A refinery produced wastewater (feed water) having dissolved selenium at levels ranging from 0.3 to 19 ppb and total selenium ranging from 1 to 20 ppb at a pH ranging between 7.0 and 8.7 as well as various dissolved metals including iron at a concentration ranging from 0 to 0.57 mg/L and manganese at a concentration ranging from 0 to 1.644 mg/L. A treatment system was implemented to test treatment of the wastewater to attempt to provide a 30-day average selenium concentration of less than 4.6 ppb in process effluent from the treatment system as well as to reduce the concentration of other dissolved metals to acceptable levels.

The treatment system included a series of pretreatment filters including two Filox™ catalytic oxidation media vessels (for iron and manganese removal) followed by ultrafiltration (UF) and reverse osmosis (RO) filters in UF and RO skids, respectively, provided by Evoqua Water Technologies. The UF skid incorporated an inside-out flow path through four inge Dizzer® XL 0.9 MB 60 UF membrane modules. Ferric chloride and sodium hypochlorite were added ahead of the UF skid to coagulate suspended solids and some TOC in the feed water, improving UF performance. The chemicals and dosages added upstream of the UF and RO modules were as follows:

TABLE 1

UF feed pretreatment chemicals

| Chemical Name | Chemical Dose |
|---|---|
| Ferric Chloride (UF feed) | 6.0-6.7 mg/L |
| Sodium Hypochlorite (UF feed) | Variable to maintain 0.5 mg/L free chlorine residual |
| Antiscalant (RO feed) | 6-7 mg/L |
| Sodium bisulfate | ORP based |
| Sulfuric Acid (RO feed) | to pH of 7.0 |

The feed water was forced through the UF membranes and collected and pumped to the RO skid. The feed water contaminants accumulated on the inner surface of the membranes and were flushed out during regular backwash cycles. Periodically bleach, acid, and caustic were added to the backwashes to control fouling and scaling and restore normalized permeability to the membranes. Feed water flux through the UF membrane modules was set at 31 gfd with backwashes every 50 minutes and chemical enhanced backwashes once every two weeks for a portion of the testing and once every four weeks for another portion of the testing.

A UF filtrate tank inside the UF-RO pilot trailer collected filtrate to feed the RO skid, and provided filtered water for UF backwashes. The tank also provided reaction time for pH adjustment ahead of the RO skid as needed to control membrane scaling with feed waters of high scaling potential. Antiscalant and sodium bisulfite were dosed as needed ahead of the RO skid.

The RO skid included a cartridge filter, booster pump, and 8" membranes arranged in 1:1-3M array. The skid also included a recycle valve on the concentrate side to maintain a minimum velocity through the RO membranes. Both nanofiltration (NF) membranes and brackish water (RO) membranes were tested. RO recovery was set at 77% with a flux of 12 gfd after initial testing to reduce scaling in the downstream bioreactor. RO flushes were performed for 20 minutes 2-3 times per week. The nanofiltration membranes rejected 90% of the total selenium on average, while the brackish water membranes averaged 94% rejection of total selenium.

Brine output from the RO filters was fed directly into a SeHAWK® bioreactor (Evoqua Water Technologies). Nutrient (BioElix 131-GUP-900-A) was dosed into the brine from the RO filters ahead of the SeHAWK® bioreactor to act as an electron donor for biological reduction. The nutrient consisted of a carbon source blended with macronutrients of nitrogen and phosphorous for biological growth.

The SeHAWK® bioreactor system included an up flow expanded bed bioreactor followed by a downflow bioreactor, with integrated process pumps, analytical equipment, chemical feed equipment, and backwash supply tank. Granular activated carbon was loaded into the first and second stages of the SeHAWK® bioreactor and the media was seeded with a microbial inoculant. Nutrient provided to the SeHAWK® bioreactor was adjusted (BioElix 131-GUP-900-A dosed at 45 mg/L as COD) until the SeHAWK® bioreactor was operating at an ORP of −400 mV.

Nitrate concentrations in the RO brine ranged from <10 mg/L $NO_3$ to >80 mg/L $NO_3$. The stage 1 bioreactor demonstrated complete removal of nitrate concentrations in the RO brine stream. This complete removal of nitrate served as an indicator that adequate reducing conditions existed in the bioreactor to allow for selenium reduction to take place.

Selenium speciation testing showed that the feed water and RO brine entering the SeHAWK® bioreactor was comprised of oxidized forms of selenium, with 76% of selenium as selenite (Se(IV)) and 24% selenate (Se(VI)). Furthermore, the speciation analysis revealed that significant levels of selenocyanate (SeCN) and lesser amounts of selenosulfate ($SeSO_3$) were being formed within the SeHAWK® bioreactor. Without wishing to be bound to a particular theory, it was believed that cyanide and/or cyanate in the feedwater likely converted to selenocyanate within the reducing environment of the SeHAWK® bioreactor.

Total selenium was reduced from 58.0 μg/L in the RO brine to 26.3 μg/L in the SeHAWK® bioreactor stage 2 effluent, representing 54.6% removal across the testing on average. The average final effluent selenium results after dilution with all of the RO permeate were 9.2±4.1 μg/L total and 8.6±3.7 μg/L. These results were achieved for feed treated through the pretreatment and bioreactor, but not the peroxide and iron co-precipitation post treatment. Formation of cyanate/selenium complex in the SeHAWK® bioreactor may have contributed to the insufficient selenium removal to the 4.6 μg/L goal without further treatment.

Effluent from the SeHAWK® bioreactor was fed through an iron co-precipitation post treatment process including dosing of the effluent with hydrogen peroxide and ferric chloride ahead of a multimedia filter to attain elevated selenium removal. The SeHAWK® effluent was treated with hydrogen peroxide to oxidize residual selenium in the form of SeCN to selenite. Once in the form of selenite, the selenium could be precipitated and removed from the process stream by the application of iron in the form of $FeCl_3$, followed by filtration. The stage 3 column of the SeHAWK® bioreactor was utilized for filtration. Ferric chloride and peroxide doses (ferric chloride dose of 20 mg/L as Fe and hydrogen peroxide dose of 15 mg/L) were adjusted to target a stage 3 effluent ORP of >200 mV. Successful removal of selenium to the testing target of <4.6 μg/L was achieved (4.2 μg/on average, translating to 1.2 μg/L selenium on average after blending with RO permeate) when the pH of the bioreactor effluent was adjusted to 6, followed by the peroxide/iron co-precipitation/filtration post treatment process.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Those skilled in the art should appreciate that the parameters and configurations described herein are exemplary and that actual parameters and/or configurations will depend on the specific application in which the disclosed methods and materials are used. Those skilled in the art should also recognize or be able to ascertain, using no more than routine experimentation, equivalents to the specific embodiments disclosed. For example, those skilled in the art may recognize that the method, and components thereof, according to the present disclosure may further comprise a network or systems or be a component of a system for reducing a concentration of dissolved selenium in water. It is therefore to be understood that the embodiments described herein are presented by way of example only and that, within the scope of the appended claims and equivalents thereto; the disclosed embodiments may be practiced otherwise than as specifically described. The present systems and methods are directed to each individual feature, system, or method described herein. In addition, any combination of two or more such features, systems, or methods, if such features, systems, or methods are not mutually inconsistent, is included within the scope of the present disclosure. The steps of the methods disclosed herein may be performed in the order illustrated or in alternate orders and the methods may include additional or alternative acts or may be performed with one or more of the illustrated acts omitted.

Further, it is to be appreciated that various alterations, modifications, and improvements will readily occur to those skilled in the art. Such alterations, modifications, and improvements are intended to be part of this disclosure, and are intended to be within the spirit and scope of the disclosure. In other instances, an existing facility may be modified to utilize or incorporate any one or more aspects of the methods and systems described herein. Thus, in some instances, the systems may involve removing dissolved selenium from water. Accordingly the foregoing description and figures are by way of example only. Further the depictions in the figures do not limit the disclosures to the particularly illustrated representations.

While exemplary embodiments are disclosed herein, many modifications, additions, and deletions may be made therein without departing from the spirit and scope of the inventive aspects and their equivalents, as set forth in the following claims.

What is claimed is:

1. A system for treatment of selenium-containing wastewater, the system comprising:

- an anoxic bioreactor having an inlet fluidically connectable to a source of the selenium-containing wastewater and an outlet;
- a pretreatment system including a catalytic oxidation media bed connected between a source of the selenium-containing wastewater and the anoxic bioreactor;
- a source of an oxidant configured to introduce the oxidant into a conduit fluidically coupled to and downstream of the outlet of the anoxic bioreactor;
- a source of a coagulant configured to introduce the coagulant into the conduit downstream of the outlet of the anoxic bioreactor; and
- a solids-liquid separator having an inlet in fluid communication with the conduit downstream of a point of introduction of the coagulant and downstream of a point of introduction of the oxidant, a solids outlet, and a liquids outlet.

2. The system of claim 1, further comprising a source of pH adjustment agent configured to introduce the pH adjustment agent into the conduit downstream of the outlet of the anoxic bioreactor.

3. The system of claim 2, further comprising:

- a pH sensor in the conduit downstream of a point of introduction of the pH adjustment agent; and
- a controller in communication with the pH sensor and configured to control the source of pH adjustment agent to maintain a pH of a liquid downstream of the point of introduction of the pH adjustment agent at a pH in a range of from 4 to 6.

4. The system of claim 2, further comprising a first inline mixer in the conduit downstream of the point of introduction of the oxidant and upstream of the solids-liquid separator.

5. The system of claim 4, further comprising a second inline mixer in the conduit downstream of the point of introduction of the pH adjustment agent and upstream of the solids-liquid separator.

6. The system of claim 1, further comprising a first ORP sensor configured to measure an ORP of liquid exiting the anoxic bioreactor.

7. The system of claim 6, further comprising a controller in communication with the first ORP sensor and configured to control the anoxic bioreactor to maintain the ORP of the liquid at between −200 mV and −450 mV.

8. The system of claim 7, further comprising a second ORP sensor configured to measure an ORP of process effluent exiting the liquids outlet.

9. The system of claim 8, wherein the controller is further in communication with the second ORP sensor, the source of oxidant, and the source of coagulant and configured to control one or both of the source of oxidant and source of coagulant to maintain the ORP of the process effluent at or above 200 mV.

10. The system of claim 1, wherein the pretreatment system further comprises at least one reverse osmosis unit fluidly connected between a source of the selenium-containing wastewater and the anoxic bioreactor.

11. The system of claim 10, wherein the pretreatment system further comprises at least one ultrafiltration unit fluidly connected upstream of the at least one reverse osmosis unit.

12. The system of claim 1, further comprising a controller configured to cause a time between the wastewater exiting the anoxic bioreactor and entering the solids/liquid separator to be less than 60 minutes.

* * * * *